(12) United States Patent
Zhang et al.

(10) Patent No.: US 11,223,700 B2
(45) Date of Patent: Jan. 11, 2022

(54) EDGE COMPUTING NODE DEVICE

(71) Applicant: Shenzhen Jingjiang Yunchuang Technology Co., Ltd., Shenzhen (CN)

(72) Inventors: Xue-Qin Zhang, Shenzhen (CN); Juka Oh, Shenzhen (CN)

(73) Assignee: Shenzhen Jingjiang Yunchuang Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/026,673

(22) Filed: Sep. 21, 2020

(65) Prior Publication Data
US 2021/0344776 A1  Nov. 4, 2021

(30) Foreign Application Priority Data
Apr. 30, 2020  (CN) .......................... 202010367754.6

(51) Int. Cl.
*H04L 29/08* (2006.01)
*H04L 29/06* (2006.01)

(52) U.S. Cl.
CPC ............ *H04L 67/327* (2013.01); *H04L 63/20* (2013.01); *H04L 67/10* (2013.01); *H04L 67/2866* (2013.01)

(58) Field of Classification Search
CPC ... H04L 67/327; H04L 67/10; H04L 67/2866; H04L 63/20
See application file for complete search history.

(56) References Cited

U.S. PATENT DOCUMENTS

| | | | |
|---|---|---|---|
| 6,910,072 B2 * | 6/2005 | Macleod Beck ... | H04M 3/5237 709/224 |
| 9,425,893 B1 * | 8/2016 | Srinivasan ......... | H04Q 11/0005 |
| 11,076,001 B1 * | 7/2021 | Mohamed ............. | H04L 67/143 |
| 2019/0109713 A1 * | 4/2019 | Clark .................... | H04L 9/3239 |

* cited by examiner

*Primary Examiner* — El Hadji M Sall
(74) *Attorney, Agent, or Firm* — ScienBiziP, P.C.

(57) ABSTRACT

An edge computing node device able to process and respond to data received in real-time includes at least one input interface and at least one output interface. The device obtains an identification of the at least one input interface and determines a functional service algorithm corresponding to the identification of at least one input interface by querying a service relationship table. The device further processes the data to obtain a calculation result according to the functional service algorithm and transmits the calculation of the data or the basic data to the output interface. The at least one output interface sends the basic data or the calculation result of the data by the second communication unit.

16 Claims, 5 Drawing Sheets

EDGE COMPUTING NODE DEVICE

CROSS-REFERENCE TO RELATED APPLICATIONS

This application claims priority to Chinese Patent Application No. 202010367754.6 filed on Apr. 30, 2020, the contents of which are incorporated by reference herein.

FIELD

The subject matter herein generally relates to the data processing field, especially to an edge computing node device.

BACKGROUND

The cloud computing platform of the existing Internet model not only consumes a lot of power, but also suffers from lack of bandwidth, so returning data in real-time is problematic for cloud computing. Besides, data is usually analyzed and processed at the edge layer by an edge computing node device. However, the existing definition of edge computing node device is vague, and there is no uniform edge computing node device technology architecture and functional architecture.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

The term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Figure 1:
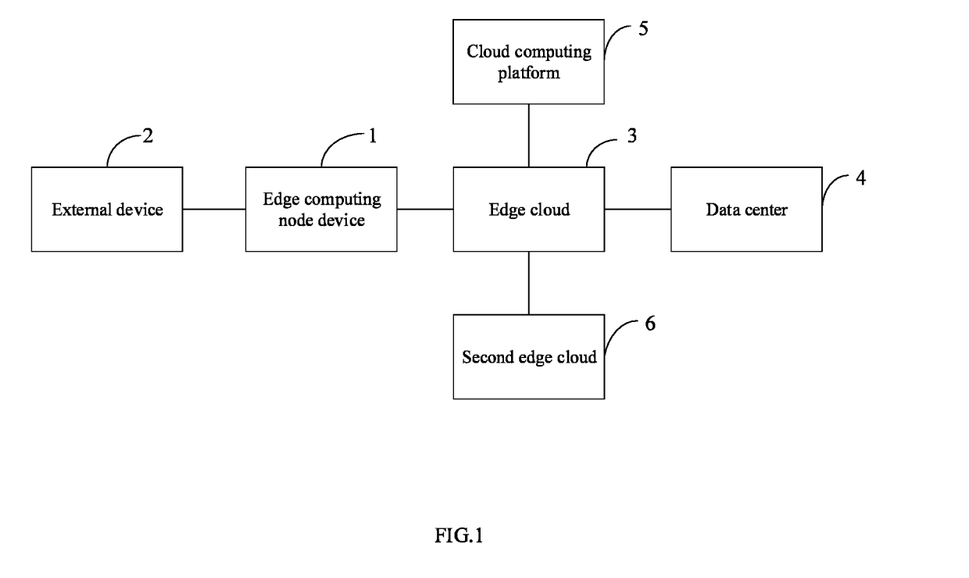
FIG. 1 is a block diagram of an embodiment of a running environment of an edge computing node device.

FIG. 1 illustrates a running environment of an edge computing node device 1. The edge computing node device 1 communicates with at least one external device 2 and an edge cloud 3. The edge computing node device 1 can receive and process data sent by the external device 2. The edge computing node device 1 can further send the data from the external device 2 or the data after processing to the edge cloud 3. The edge computing node device 1 communicates with a data center 4, a cloud computing platform 5, and a second edge cloud 6 respectively, and can send the data sent by the external device 2 or the data after processing to the data center 4, the cloud computing platform 5, and the second edge cloud 6. In at least one embodiment, each of the edge cloud 3 and the second edge cloud 6 is a cloud platform server. In at least one embodiment, the external device 2 can be a data collector, a data acquisition card, a sensor, or an image collector (e.g. a camera, an endoscope, a light field camera, etc.). In at least one embodiment, the edge computing node device 1 is a logical abstraction of a basic ability of an edge gateway, an edge controller, an edge server, and other product forms. The edge computing node device 1 can perform real-time data analysis, local data storage, real-time network connection, and other functions.

Figure 2:
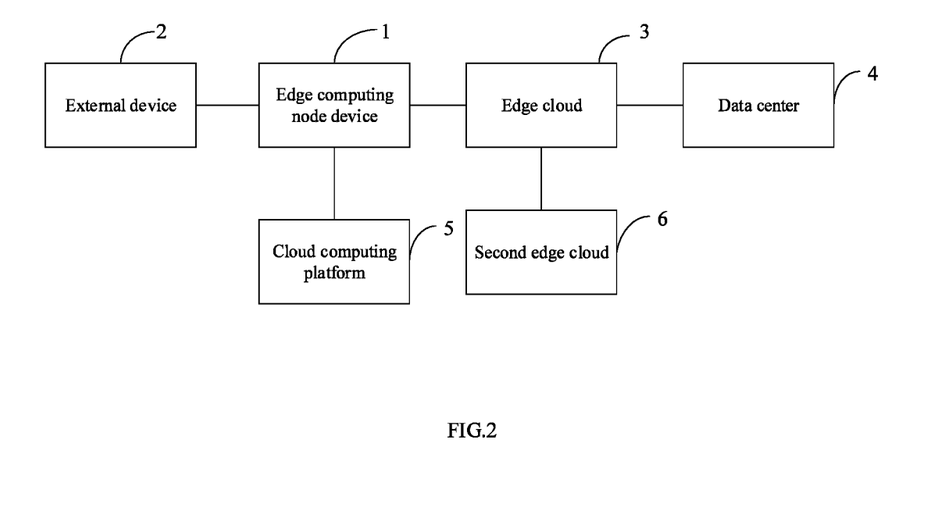
FIG. 2 is another block diagram of a running environment of the edge computing node device of FIG. 1.

FIG. 2 illustrates another running environment of the edge computing node device 1. The edge computing node device 1 communicates with the cloud computing platform 5. The edge computing node device 1 receives data sent by the external device 2, processes the data sent by the external device 2, and obtains a first calculation result of the data. The edge computing node device 1 further sends the data sent by the external device 2 or the first calculation result to the cloud computing platform 5. The cloud computing platform 5 further analyzes the first calculation result or the data sent by the edge computing node device 1 to obtain a second calculation result of the data and sends the second calculation result of the data to the edge computing node device 1. The edge cloud 3 sends the second calculation result of the data to the data center 4 and the second edge cloud 6.

Figure 3:
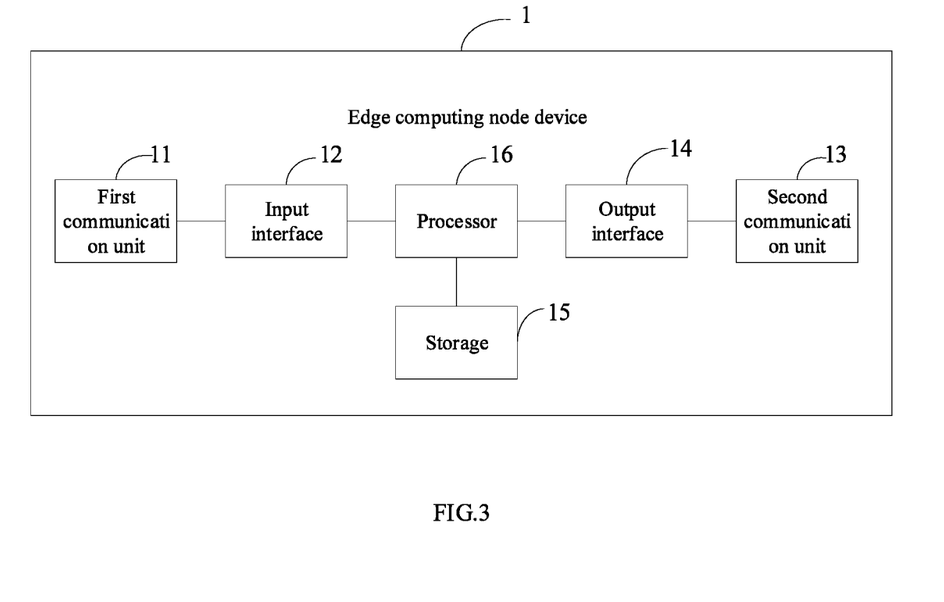
FIG. 3 is a block diagram of an embodiment of the edge computing node device.

FIG. 3 illustrates the edge computing node device 1. The edge computing node device 1 includes a first communication unit 11, at least one input interface 12, a second communication unit 13, at least one output interface 14, a storage 15, and a processor 16. In at least one embodiment, the at least one input interface 12 connects to the first communication unit 11. The least one output interface 14 connects to the second communication unit 13. The processor 16 connects to the at least one input interface 12, the at least one output interface 14, and the storage 15. The at least one input interface 12 receives the data sent by the external device 2 through the first communication unit 11.

In at least one embodiment, the input interface 12 corresponds to a preset access mode and a preset access service. The input interface 12 receives the data sent by the external device 2 according to the preset access mode and the preset access service. The preset access mode is a certain way in which the input interface 12 receives the data, and the preset access service is a functional service of the data. In one embodiment, the preset access mode includes a wired access mode and a wireless access mode. The wired access mode includes a PROFIBUS access mode, a MODBUS access mode, a CANBUS access mode, and an ETHERCAT bus access mode. The wireless access mode includes a 4G access mode, a 5G access mode, a WIFI access mode, a LORA access mode, and an NBIOT access mode. In one embodiment, the preset access service includes, but is not limited to, a data collaboration service, a data computing service, a data analysis service, a rapid data model ingenuity service, a deep learning service, a speech recognition service, a semantic understanding service, a speech synthesis service, an image analysis service, an image analysis service, an entertainment service, a game service, a streaming service, and a translation service. In one embodiment, the first communication unit 11 can be a wireless communication module, such as a 4G communication module, a 5G communication module, a WIFI communication module, a LORA communication module, or an NBIOT communication module. In another embodiment, the first communication unit 11 can be a wired communication module, such as a PROFIBUS, a MODBUS, a CANBUS, or an ETHERCAT bus.

In at least one embodiment, the storage 15 stores data or soft code of the edge computing node device 1. The storage 15 can include various types of non-transitory computer-readable storage mediums. For example, the storage 15 can be an internal storage system of the edge computing node device 1, such as a flash memory, a random access memory (RAM) for the temporary storage of information, and/or a read-only memory (ROM) for permanent storage of information. In another embodiment, the storage 15 can also be an external storage system of the edge computing node device 1, such as a hard disk, a storage card, or a data storage medium. In one embodiment, the processor 16 can be a central processing unit, a common processor, a digital signal processor, a dedicated integrated circuit, a ready-made programmable gate array, another programmable logic device, discrete door or transistor logic device, discrete hardware component, or the like. In another embodiment, the processor 16 can be any conventional processor. The processor 16 can also be a control center of the edge computing node device 1, using various interfaces and lines to connect the various parts of the edge computing node device 1.

Figure 4:
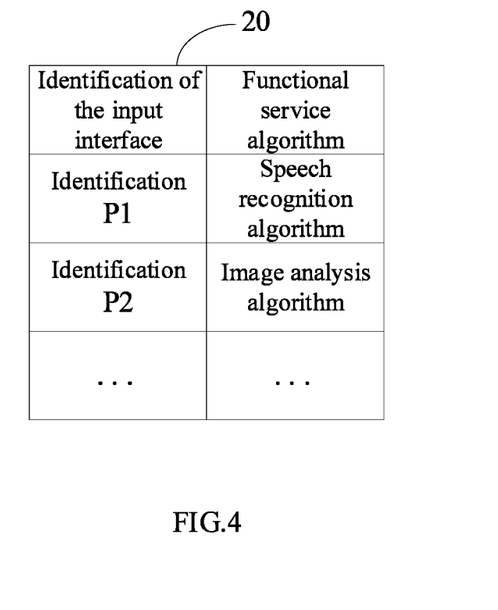
FIG. 4 is a diagram of a service relationship table.

In one embodiment, the processor 16 obtains an identification of the input interface 12, and determines a functional service algorithm corresponding to the identification of the input interface 12 by querying a service relationship table 20 of the input interface 12. The data received by the input interface 12 is processed to obtain a calculation result of the data according to the functional service algorithm. In at least one embodiment, the service relationship table 20 includes a number of identifications of the input interface 12 and a number of functional service algorithms and defines a correspondence between the number of identifications of the input interface 12 and the number of functional service algorithms.

FIG. 4 illustrates the service relationship table 20. In service relationship table 20, the functional service algorithm corresponding to identification P1 is a speech recognition algorithm, and the functional service algorithm corresponding to identification P2 is an image analysis algorithm. For example, when the identification of the input interface 12 is P1, the processor 16 determines that the functional service algorithm should be the speech recognition algorithm by querying the service relationship table 20. For example, when the identification of the input interface 12 is P2, the processor 16 determines that the functional service algorithm should be the image analysis algorithm by querying the service relationship table 20.

In one embodiment, the processor 16 stores the calculation of the data or the data received by the input interface 12 according to a preset storage rule. In detail, the processor 16 sets a data storage path, a data storage cycle, and a data storage starting time, and stores the calculation of the data or the data received by the input interface 12 according to the data storage path, the data storage cycle, and the data storage start time. In at least one embodiment, the data storage path can be set in an on-premises database of the edge computing node device 1, the edge cloud 3, the data center 4, the cloud computing platform 5, or the second edge cloud 6.

In at least one embodiment, the data received by the input interface 12 includes an identification of the external device 2, and the processor 16 obtains the identification of the external device 2 from the data. In at least one embodiment, the identification of the external device 2 includes a device name information, an application area information, a company name information, and an equipment number information. For example, when the external device 2 is an instrument, the identification of the external device 2 can be T_Instrument_domain_company_name_device name_equipment number. When the external device 2 is a sensor, the identification of the external device 2 can be T_Sensor_domain_company_name_device name_equipment number.

Figure 5:
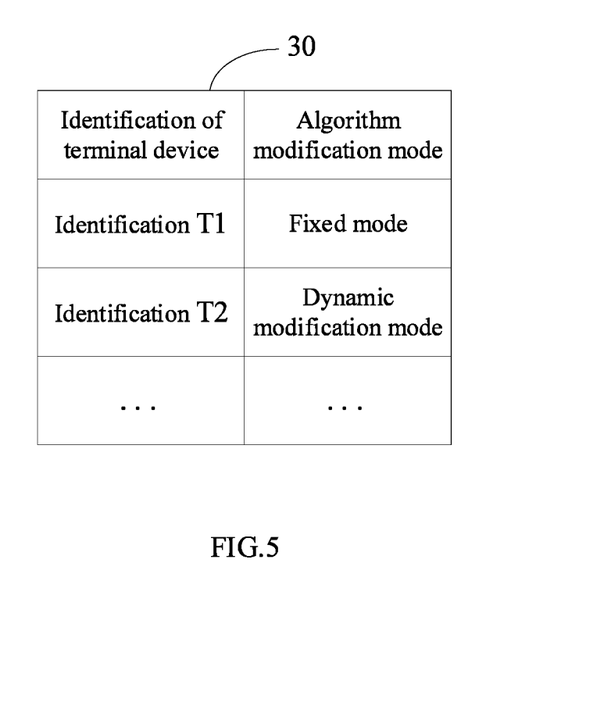
FIG. 5 is a diagram of an embodiment of an algorithm permission modification table.

In at least one embodiment, the processor 16 receives a first instruction, and modifies the functional service algorithm in response to the first instruction. In detail, the processor 16 queries an algorithm permission modification table 30 to determine an algorithm modification mode of the external device 2 corresponding to the identification of the external device 2. The processor 16 determines whether the algorithm modification mode is a dynamic modification mode, and modifies the functional service algorithm according to the first instruction when determining that the algorithm modification mode is a dynamic modification mode. The algorithm modification mode includes a fixed mode and a dynamic modification mode. The fixed mode indicates that the functional service algorithm cannot be modified. The dynamic modification mode indicates that the algorithm mode can be modified. FIG. 5 illustrates the algorithm permission modification table 30. The algorithm permission modification table includes a number of identifications of multiple external devices 2 and a number of algorithm modification modes, and defines a correspondence between the number of identifications of multiple external devices 2 and the number of algorithm modification modes. For example, when the identification of the external device 2 is T1, the algorithm modification mode corresponding to T1 is the fixed mode, when the identification of the external device 2 is T2, the algorithm modification mode corresponding to T2 is the dynamic modification mode.

The processor 16 receives a second instruction sent by the edge cloud 3 or the cloud computing platform 5, verifies an authority of the edge cloud 3 or the cloud computing platform 5, and receives the functional service algorithm sent by the edge cloud 3 or the cloud computing platform 5 after the edge cloud 3 or the cloud computing platform 5 has passed verification. The received functional service algorithm is taken as a target algorithm, all the data of the edge computing node device 1 is stored, and the functional service algorithm of the edge computing node device 1 is updated according to the target algorithm. In one embodiment, the processor 16 records a successful updating information of the functional service algorithm or a failed updating information of the functional service algorithm in a log.

In at least one embodiment, the processor 16 receives the second instructions generated by the edge computing node device 1, and selects one functional service algorithm from the multiple functional service algorithms stored in the edge computing node device 1 as the target algorithm. All the data of the edge computing node device 1 is stored, and the functional service algorithm of the edge computing node device 1 is updated according to the target algorithm.

In at least one embodiment, the processor 16 provides property information of the edge computing node device 1. The property information includes identification of the edge computing node device 1, calculation ability and capacity, functional service, processing delay time, storage capacity, and data structure. In one embodiment, the functional service includes, but is not limited to, data collaboration, data computing, data analysis, rapid data modeling, deep learning, speech recognition, semantic understanding, speech synthesis, image analysis, image analysis, entertainment services, game service, streaming service, and translation service. The present disclosure ensures that the property information of the edge computing node device 1 is collected, and facilitates a selection by the external device 2 of a suitable edge computing node device 1 to provide services according to the property information of the edge computing node device 1.

In at least one embodiment, the processor 16 carries out a security check on the data received by the input interface 12. In detail, the processor 16 selects one checking mode from three checking modes of virus scanning, whitelist scanning, and security authentication, and checks the data according to the selected checking mode. The processor 16 records abnormal data if the result of a security check is abnormal and distinguishes and reports the abnormal data. In one embodiment, when checking the data according to the checking mode of virus scanning, the processor 16 compares the data with virus files in a virus database and acquires the result of the security check of the data. The processor 16 can determine that the data is abnormal if the result of a security check of the data indicates that the data is consistent with virus files in the virus database, otherwise determining that the data is not abnormal. In one embodiment, when checking the data according to the checking mode of whitelist scanning, the processor 16 compares the data with lists in a whitelist database and acquires the result of the security check of the data, determining that the data is abnormal if the security check result is that the data is consistent with the lists in the whitelist database, otherwise determining that the data is not abnormal. In one embodiment, when checking the data according to the checking mode of the security authentication, the processor 16 can determine that the data is abnormal if the data does not pass security authentication, otherwise determining that the data is not abnormal.

In one embodiment, the processor 16 transmits the calculation of the data or the data received by the input interface 12 to the output interface 14. The output interface 14 corresponds to a preset output mode and a preset output service. The output interface 14 sends the data or the calculation results of the data by the second communication unit 13 according to the preset output mode and the preset output service.

In one embodiment, the preset output mode is a certain way in which the output interface 14 sends the data. The preset output service is a functional service of the data. In one embodiment, the preset output mode includes a wired output mode and a wireless output mode. The wired output mode includes a PROFIBUS access mode, a MODBUS access mode, a CANBUS access mode, and an ETHERCAT bus access mode. The wireless output mode includes a 4G output mode, a 5G output mode, a WIFI access mode, a LORA access mode, and an NBIOT access mode. In one embodiment, the preset output service includes, but is not limited to, a data collaboration service, a data computing service, a data analysis service, a rapid data model ingenuity service, a deep learning service, a speech recognition service, a semantic understanding service, a speech synthesis service, an image analysis service, an image analysis service, an entertainment service, a game service, a streaming service, and a translation service. In one embodiment, the second communication unit 13 can be a wireless communication module such as a 4G communication module, a 5G communication module, a WIFI communication module, a LORA communication module or an NBIOT communication module. In another embodiment, the second communication unit 13 can be a PROFIBUS, a MODBUS, a CANBUS, or an ETHERCAT bus.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An edge computing node device, comprising:
a first communication unit;
at least one input interface coupled to the first communication unit to receive data from the first communication unit;
a second communication unit;
at least one output interface coupled to the second communication unit;
a processor coupled to the at least one input interface and the at least one output interface;
a non-transitory storage medium coupled to the processor and configured to store a plurality of instructions, which causes the processor to:
obtains an identification of the at least one input interface;
determines a functional service algorithm corresponding to the identification of the at least one input interface by querying a service relationship table;
process the data to obtain a calculation result of the data according to the functional service algorithm, wherein the service relationship table comprises a plurality of identifications of the at least one input interface and a plurality of functional service algorithms and defines a correspondence between the plurality of identifications of the at least one input interface and the plurality of functional service algorithms;

transmit the calculation of the data or the data to the output interface;
wherein the at least one output interface sends the data or the calculation results of the data by the second communication unit.

2. The edge computing node device according to claim 1, wherein the at least one input interface corresponds to a preset access mode and a preset access service, the at least one input interface receives the data sent by an external device according to the preset access mode and the preset access service, wherein the preset access mode is a way in which the at least one input interface receives the data, and the preset access service is a functional service of the data.

3. The edge computing node device according to claim 2, wherein the preset access mode comprises a wired access mode and a wireless access mode, the wired access mode can be at least one of a PROFIBUS access mode, a MODBUS access mode, a CANBUS access mode, and an ETHERCAT bus access mode, the wireless access mode can be at least one of a 4G access mode, a 5G access mode, a WIFI access mode, a LORA access mode, and an NBIOT access mode.

4. The edge computing node device according to claim 3, wherein the preset access service can be at least one of a data collaboration service, a data computing service, a data analysis service, a rapid data model ingenuity service, a deep learning service, a speech recognition service, a semantic understanding service, a speech synthesis service, an image analysis service, an image analysis service, an entertainment service, a game service, a streaming service, and a translation service.

5. The edge computing node device according to claim 3, wherein the first communication unit can be a wireless communication module or a wired communication module.

6. The edge computing node device according to claim 1, wherein the plurality of instructions is further configured to cause the processor to:
set a data storage path, a data storage cycle and a data storage starting time; and
store the calculation of the data or the data according to the data storage path, the data storage cycle and the data storage start time.

7. The edge computing node device according to claim 6, wherein the data storage path is set in an on-premises database of the edge computing node device, an edge cloud, a data center, or a cloud computing platform.

8. The edge computing node device according to claim 2, wherein the plurality of instructions is further configured to cause the processor to:
receive a first instruction and modify the functional service algorithm in response to a first instruction.

9. The edge computing node device according to claim 8, wherein the plurality of instructions is further configured to cause the processor to:
query an algorithm permission modification table to determine an algorithm modification mode of the external device corresponding to an identification of the external device;
determine whether the algorithm modification mode is a dynamic modification mode, wherein the algorithm modification mode comprises a fixed mode and a dynamic modification mode, the fixed mode indicates that the functional service algorithm cannot be modified, the dynamic modification mode indicates that the algorithm mode can be modified; and
modify the functional service algorithm according to the first instruction when the algorithm modification mode is the dynamic modification mode.

10. The edge computing node device according to claim 8, wherein the plurality of instructions is further configured to cause the processor to:
receive a second instruction sent by an edge cloud or a cloud computing platform;
verify an authority of the edge cloud or the cloud computing platform;
receive the functional service algorithm sent by the edge cloud or the cloud computing platform after the edge cloud or the cloud computing platform passes verification;
take the functional service algorithm received as a target algorithm;
store all the data of the edge computing node device; and
update the functional service algorithm of the edge computing node device according to the target algorithm.

11. The edge computing node device according to claim 8, wherein the plurality of instructions is further configured to cause the processor to:
record a successful updating information of the functional service algorithm or a failed updating information of the functional service algorithm in a log.

12. The edge computing node device according to claim 8, wherein the plurality of instructions is further configured to cause the processor to:
receive a second instruction generated by the edge computing node device;
select one of the plurality of functional service algorithms stored in the edge computing node device as a target algorithm;
store all the data of the edge computing node device; and
update the functional service algorithm of the edge computing node device according to the target algorithm.

13. The edge computing node device according to claim 8, wherein the plurality of instructions is further configured to cause the processor to:
provide property information of the edge computing node device, wherein the property information comprises an identification of the edge computing node device, a calculation ability and capacity, a functional service, a processing delay time, a storage capacity, and a data structure.

14. The edge computing node device according to claim 8, wherein the plurality of instructions is further configured to cause the processor to:
carry out a security check on the data received by the at least one input interface.

15. The edge computing node device according to claim 14, wherein the plurality of instructions is further configured to cause the processor to:
select one checking mode from three checking modes of virus scanning, whitelist scanning and security authentication, and check the data according to the checking mode selected, record abnormal data if the result of a security check is abnormal, and distinguish and report the abnormal data.

16. The edge computing node device according to claim 14, wherein the at least one output interface corresponds to a preset output mode and a preset output service, the output interface sends the data or the calculation results of the data according to the preset output mode and the preset output service, wherein the preset output mode is a way in which the output interface sends the data, the preset output service is a functional service of the data.

* * * * *